July 23, 1957
H. G. CARLSON ET AL
2,800,621
VOLTAGE SENSING DEVICE
Filed June 26, 1956
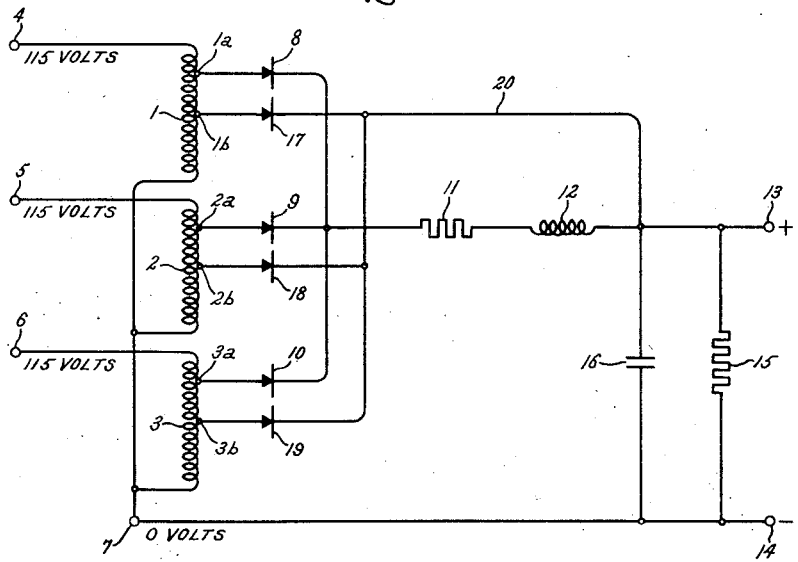
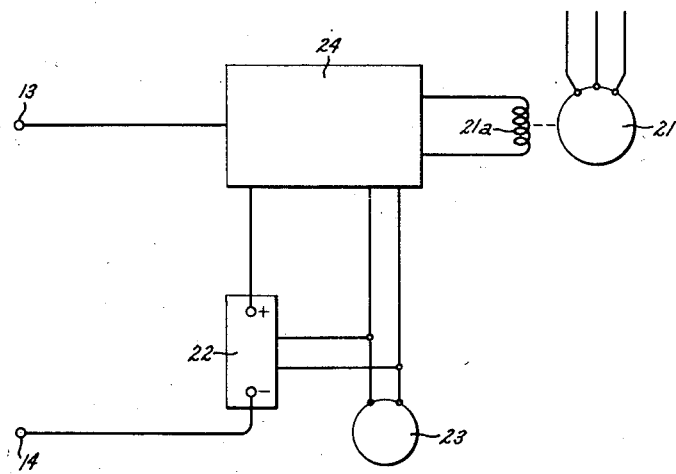
Inventors:
Harold G. Carlson,
Arthur C. Hupp,
by Irving H. Marshman
Their Attorney.

United States Patent Office 2,800,621
Patented July 23, 1957

2,800,621

VOLTAGE SENSING DEVICE

Harold G. Carlson and Arthur C. Hupp, Waynesboro, Va., assignors to General Electric Company, a corporation of New York Application June 26, 1956, Serial No. 594,061

5 Claims. (Cl. 321—8)

This invention relates to voltage sensing devices, more particularly to polyphase voltage sensing devices, and it has for an object the provision of a simple, reliable and improved device of this character.

Still more specifically, the invention relates to polyphase voltage sensing devices intended for use with regulating devices and systems, and a further object of the invention is the provision of a polyphase voltage sensing device which senses the average of the polyphase voltages during balanced operating conditions and within a limited range of unbalanced voltage conditions and in which is incorporated a take-over network for sensing the highest phase voltage during unbalanced voltage conditions beyond such limited range.

In carrying the invention into effect in one form thereof, a polyphase impedance device is connected to be supplied from polyphase voltage supply terminals. Each phase of the impedance device is provided with a relatively high voltage tap and with a relatively low voltage tap. A direct voltage proportional to the average value of the polyphase voltages is supplied to direct voltage output terminals by means of a polyphase average voltage sensing network which is supplied from the relatively high voltage taps of the impedance device. A peak voltage sensing network supplied from the relatively low voltage taps supplies to the direct voltage output terminals a direct voltage which is proportional to the peak voltage at the low voltage taps. Under balanced conditions, the voltage supplied by the peak voltage sensing network to the output terminals is less than the voltage supplied thereto by the average voltage sensing network and is therefore ineffective. However, under unbalanced operating conditions when one of the phase voltages becomes high enough to cause the peak voltage at the relatively low voltage tap for that phase to exceed the average polyphase voltages of the relatively high voltage taps by predetermined amount, the voltage supplied by the peak sensing network to the output terminals becomes the effective voltage at the output terminals and the average voltage sensing network becomes ineffective. Similarly, if one of the phase voltages becomes low enough to cause the average voltage at the relatively high voltage taps to decrease below the peak voltage of the relatively low voltage tap of any of the other phases by the same predetermined amount, the voltage supplied by the peak sensing network to the output terminals becomes the effective voltage and the average voltage sensing network becomes ineffective.

For a better and more complete understanding of the invention, reference should now be had to the following specification and to the accompanying drawing of which Fig. 1 is a simple elementary diagrammatic sketch of an embodiment of the invention, and Fig. 2 is a simple diagrammatic sketch illustrating the application of the highest phase voltage take-over network in a voltage regulating system.

Referring now to the drawing, a polyphase impedance device such as the three single phase auto transformers having separate phase windings 1, 2 and 3 is connected to be supplied from the polyphase voltage supply terminals 4, 5 and 6. As shown, the individual phase windings 1, 2 and 3 have one terminal connected to a corresponding one of the terminals 4, 5 and 6 and the other terminal connected to a neutral point 7. The supply terminals 4, 5 and 6 may be assumed to be the terminals of a polyphase generator which the voltage is to be maintained substantially constant, or they may be assumed to be terminals which are connected to such generator terminals. The voltage of each of the terminals 4, 5 and 6 with respect to the neutral point may be assumed to be any conventional value such for example as 115 volts.

Each of the separate phase windings of the transformer is provided with a relatively high voltage tap and a relatively low voltage tap. As shown, the three-phase windings 1, 2 and 3 are provided with relatively high voltage taps 1a, 2a and 3a respectively and with relatively low voltage taps 1b, 2b and 3b respectively. The high voltage taps 1a, 2a and 3a are positioned at equal voltage points on their respective windings of which the effective voltage with respect to neutral may be a suitable value such for example as 102 volts. Supplied from the relatively high voltage terminals is a polyphase rectifier having individual single phase rectifiers 8, 9 and 10 connected to the high voltage taps 1a, 2a and 3a respectively. The direct current output circuit of the rectifier is connected through the series combination of resistor 11 and inductance 12 to a direct voltage output terminal 13. The other output terminal 14 is connected to the neutral 7. Across the output terminals 13 and 14 are connected in parallel with each other a resistor 15 and a capacitor 16.

The rectifiers 8, 9 and 10, the resistor 11, inductance 12 and resistor 15 operate as an average voltage sensing network, i. e. they co-operate to produce across the resistor 15 at the output terminals 13 and 14, a voltage which is proportional to the average of the three voltages at the relatively high voltage taps 1a, 2a and 3a. Appropriately, the resistor 11, inductance 12, resistor 15 and capacitor 16 may have values of 100 ohms, .25 henry, 4,000 ohms and 4 mfd. respectively for a 400 C. P. S. system.

Assuming balanced phase operating conditions, the polyphase rectifier 8, 9, 10 produce at its D.-C. terminals a voltage of 119 volts of which 3 volts would be absorbed in the voltage drop across the resistor 11, and 116 volts would appear across resistor 15.

To the relatively low voltage taps 1b, 2b and 3b of the polyphase auto transformer are connected the individual single phase rectifiers 17, 18 and 19 respectively. The positive direct current terminal of this rectifier is directly connected by means of a conductor 20 to the common terminal of the inductance 12 and the capacitor 16, i. e. to the positive output terminal 13. Preferably, the relatively low voltage taps 1b, 2b and 3b are positioned so that the peak voltage at these taps under balanced phase voltage operating conditions is slightly less than the voltage produced at the output terminals by the average voltage rectifier. This for a voltage of 116 volts supplied to the output terminals from the average voltage sensing network, the taps 1b, 2b and 3b may be positioned so that under balanced phase operating condition, the peak voltage at these taps is 110 volts or 78 volts R. M. S.

With the foregoing understanding of the elements and their organization, the operation of the highest phase voltage take-over network will readily be understood from the following detailed description. Under balanced phase operating conditions, the average sensing network supplied from the relatively high voltage taps 1a, 2a and 3a supplies a rectified and filtered voltage of 116 volts to the output terminals 13 and 14, it being assumed that the effective voltage at the taps 1a, 2a and 3a is 102 volts. Since the peak voltage at the 78 volt taps 1b, 2b and 3b is only 110 volts, the peak sensing and rectifying network contributes no voltage to the output terminals.

Under unbalanced phase voltage conditions, however, the voltage at the output terminals 13 and 14 will be proportional to the average of the line to neutral voltages only until any one of the individual phase voltages attains a value at which its peak value exceeds the average of the three phase voltages. Under this latter condition the voltage across the capacitor 16 and consequently the voltage at the output terminals 13 and 14 across which it is connected will be proportional to the peak of the highest phase voltage, and the average sensing and rectifying network will contribute no voltage to the output terminal. In other words, at a predetermined amount of unbalance as determined by the highest line-to-neutral peak voltage exceeding a predetermined percentage of the average, the highest phase sensing network "takes over" from the average sensing network and supplies voltage to the output terminals.

The manner in which the highest phase take-over network of Fig. 1 is employed in a regulating system is indicated in Fig. 2 in which the voltage of an alternator 21 is to be maintained substantially constant at a predetermined value. The alternating voltage supply terminals 4, 5 and 6 in Fig. 1 may be assumed to be the terminals of the alternator 21 or to be connected thereto.

A source of reference voltage 22, which is illustrated conventionally in Fig. 2, provides a direct reference voltage of suitable predetermined value with which is compared the signal voltage which is derived from the alternator and supplied to the output terminals 13 and 14. This reference voltage source may be assumed to comprise an input transformer supplied from a permanent magnet alternating voltage generator 23, a rectifier and a voltage regulating glow tube supplied therefrom. The negative terminal of the reference voltage source may be connected to the negative output terminal 14 so that the difference of the two voltages may be supplied to the input circuit of a conventional static excitation and regulating system 24. This latter may appropriately comprise a single stage magnetic amplifier having an input control winding to which is supplied the difference of the reference voltage and signal voltage and an output or main load circuit winding which is connected to supply the field winding 21a of the alternator 21.

In operation under balanced phase voltage operating conditions the regulator regulates the average of the three line-to-neutral voltages. An advantage of regulating the average of the individual phase voltage is that a regulator which responds to the average is only moderately sensitive to wave form since the signal voltage at the terminals 13 and 14 varies as the ratio of R. M. S. or effective value to average value varies in the regulated generator 21.

Under unbalanced voltage phase operating conditions, the signal voltage at terminals 13 and 14 continues to be proportional to the average for small values of unbalance, e. g. the phase voltages unbalanced not greater than approximately 15%, and the regulator continues to regulate the average voltage. However, when the unbalance exceeds the predetermined amount, the signal voltage at the terminals 13 and 14 will be proportional to the peak of the highest phase voltage and the regulator will maintain the highest phase voltage constant at a predetermined value.

Thus it will be seen that since the regulator is actually regulating the voltage at terminals 13 and 14, the average voltage is held constant until the unbalance exceeds the established limit whereupon the regulator regulates the highest phase voltage. A further advantage of the invention is that the highest phase "take-over" provides highest phase voltage regulation for unbalanced voltage conditions beyond specific limits. One additional advantage is that the invention provides regulation for the entire range of balanced and unbalanced phase operating conditions and thus facilitates better protective system coordination.

Although in accordance with the provisions of the patent statutes, this invention is described as embodied in concrete form and the principle of the invention has been described together with the best mode in which it is now contemplated applying that principle it will be understood that the invention is not limited thereto since alterations and modifications will readily suggest themselves to persons skilled in the art without departing from the true spirit of this invention or from the scope of the annexed claims.

What we claim as new and desire to secure by Letters Patent of the United States is:

1. A highest phase voltage take-over network comprising in combination a plurality of polyphase voltage supply terminals, a polyphase impedance voltage drop device connected to be supplied from said terminals, and having a relatively high voltage tap and a relatively low voltage tap in each phase, a pair of direct voltage output terminals, means for supplying to said output terminals a direct voltage proportional to the average of the separate phase voltages comprising a polyphase rectifier connected to be supplied from said relatively high voltage taps, a resistor and a reactive impedance connected between said rectifier and a first of said output terminals and a resistor connected across said output terminals, and means responsive to a voltage at any of said low voltage taps in excess of the voltage at said output terminals for supplying to said output terminals a direct voltage proportional to the highest phase voltage comprising a second polyphase rectifier connected between said relatively low voltage taps and said first output terminals and a capacitor connected across said output terminals.

2. A highest phase voltage take-over network comprising in combination a plurality of polyphase voltage supply terminals, a star-connected impedance device connected to be supplied from said terminals, each phase of said impedance device having a relatively high voltage tap and a relatively low voltage tap, a first direct voltage output terminal, a second output terminal connected to the neutral of said impedance device, means for supplying to said output terminals a direct voltage proportional to the average of the separate phase voltages of said supply terminals comprising a polyphase rectifier connected to be supplied from said relatively high voltage taps and a reactive impedance and a resistor connected between said rectifier and said first output terminal, and means responsive to the peak value of the highest phase voltage of any of said low voltage taps in excess of the voltage at said output terminals for supplying to said output terminals a direct voltage proportional to said peak value of said highest phase voltage comprising a second polyphase rectifier connected between said relatively low voltage taps and said first output terminal and a capacitor connected across said output terminals.

3. A highest phase voltage take-over network comprising in combination a plurality of polyphase voltage supply terminals, a polyphase transformer connected to be supplied from said terminals, each phase of said transformer having a relatively high voltage tap and a relatively lower voltage tap, a pair of direct voltage output terminals, an average voltage sensing network comprising a polyphase rectifier connected to be supplied from said high voltage taps, a resistor and a reactive impedance device connected between said rectifier and a first of said output terminals and means responsive to a voltage at any one of said relatively low voltage taps in excess of the voltage at said output terminals for supplying to said output terminals a voltage proportionally related to the highest phase peak voltage comprising a polyphase rectifier connected to be supplied from said lower voltage taps for supplying a voltage to said output terminals and a capacitor connected across said output terminals.

4. In combination, a plurality of polyphase voltage supply terminals, a polyphase transformer connected to be supplied from said terminals having a neutral point and each phase of said transformer having a relatively high voltage tap and a relatively low voltage tap, a pair of direct voltage output terminals, an average voltage sensing network comprising a polyphase rectifier connected to be supplied from said relatively high voltage taps, a resistor and an inductance connected between said rectifier and a first of said output terminals and a resistor connected across said output terminals, and a peak voltage sensing network comprising a second polyphase rectifier directly connected between said relatively low voltage taps and said first output terminal, and a capacitor connected across said output terminals.

5. In combination, a plurality of polyphase voltage supply terminals, a polyphase star-connected transformer connected to be supplied from said terminals and each phase having a relatively high voltage tap and a relatively low voltage tap, a pair of direct voltage output terminals, one of said output terminals being connected to the neutral point of said transformers, an average sensing network for supplying to said output terminals a direct voltage proportional to the average of the separate phase voltages comprising a polyphase rectifier supplied from said source, an inductive reactance connected in the direct current circuit between said rectifier and a first of said output terminals and a resistance connected across said output terminals, and a peak voltage sensing network responsive to voltages in excess of the voltage supplied to said output terminals for supplying thereto a voltage proportional to the peak value of the highest phase voltage comprising a polyphase rectifier connected between said relatively low voltage taps and said first output terminal and a capacitor connected across said output terminals.

References Cited in the file of this patent

UNITED STATES PATENTS

| | | |
|---|---|---|
| 1,469,418 | Kubler | Oct. 2, 1923 |
| 2,704,332 | LeFleur | Mar. 15, 1955 |
| 2,777,107 | Medlar | Jan. 8, 1957 |